United States Patent [19]

Takahashi

[11] 4,393,770

[45] Jul. 19, 1983

[54] PRINTER WITH PRINTING DRUM

[75] Inventor: Hiroshi Takahashi, Yokohama, Japan

[73] Assignees: Canon Kabushiki Kaisha, Tokyo; Canon Denshi Kabushiki Kaisha, Saitama, both of Japan

[21] Appl. No.: 298,467

[22] Filed: Sep. 1, 1981

[30] Foreign Application Priority Data

Sep. 8, 1980 [JP] Japan ................................ 55-124988

[51] Int. Cl.³ ...................................... B41J 1/44
[52] U.S. Cl. ....................................... 101/93.22; 101/99
[58] Field of Search .............. 101/93.09, 93.22, 93.23, 101/23.29, 95, 96, 99, 110

[56] References Cited

U.S. PATENT DOCUMENTS

| | | | |
|---|---|---|---|
| Re. 26,240 | 7/1967 | Wasserman | 101/93.09 |
| 3,461,796 | 8/1969 | Belson et al. | 101/93.29 |
| 3,855,923 | 12/1974 | Foley | 101/93.29 |
| 3,921,517 | 11/1975 | Barcomb et al. | 101/93.09 |
| 4,152,983 | 5/1979 | Toyomura et al. | 101/93.23 |
| 4,303,013 | 12/1981 | Shimodaira | 101/93.22 X |
| 4,317,412 | 3/1982 | Bolcavage et al. | 101/93.29 X |

*Primary Examiner*—Edward M. Coven
*Attorney, Agent, or Firm*—Fitzpatrick, Cella, Harper & Scinto

[57] ABSTRACT

A table calculator provided with printer is disclosed. The printer comprises a printing drum having a group of odd digit types and a group of even digit types arranged shifted from each other in the direction of line. A pulse generator generates timing pulses corresponding to the odd digit types on the drum. Another pulse generator generates timing pulses corresponding to the even digit types. When any selected type on the drum comes into the printing position, the drum is stopped to effect printing. Printing is carried out on the basis of the timing pulse corresponding to even digit when odd digit type is to be printed. When even digit type is to be printed, the printing is carried out on the basis of timing pulse corresponding to odd digit.

2 Claims, 14 Drawing Figures

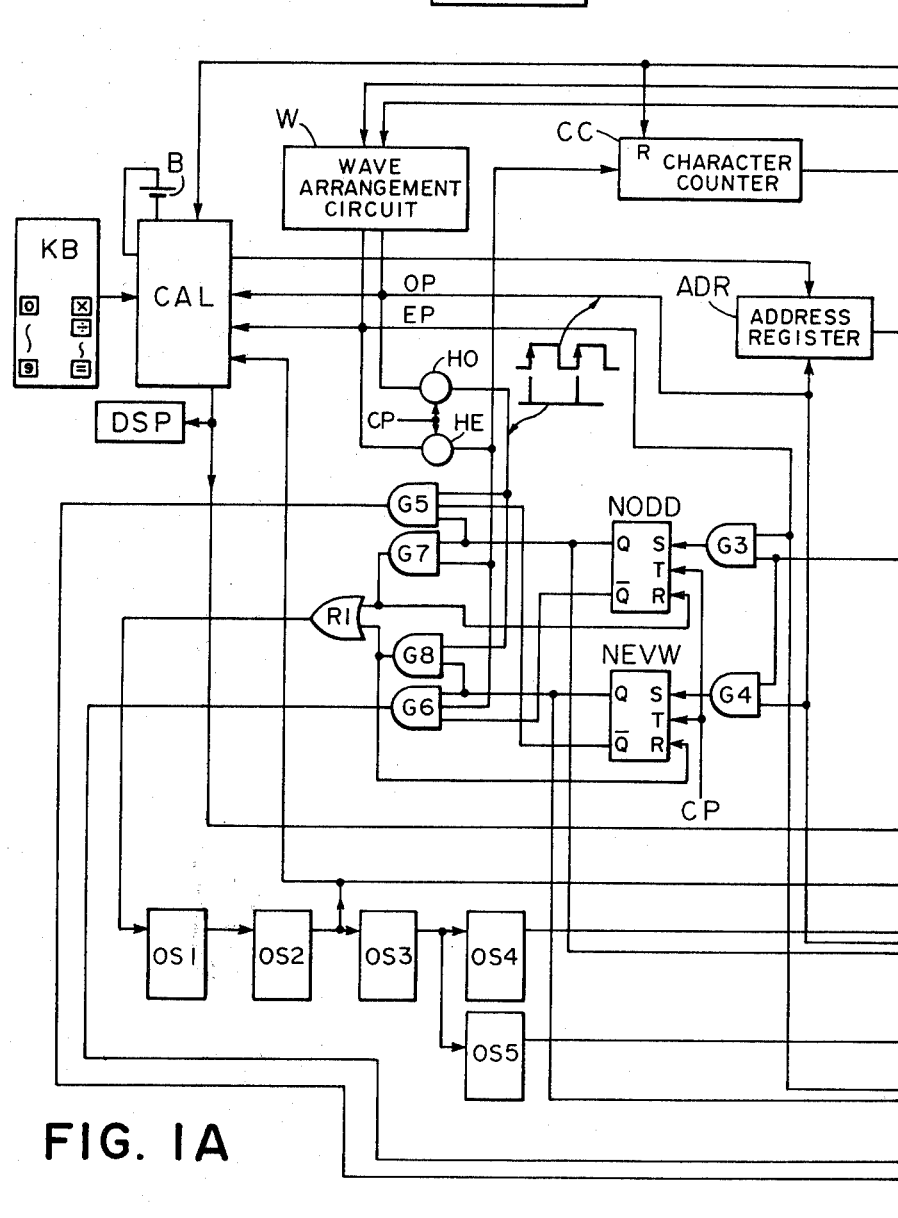

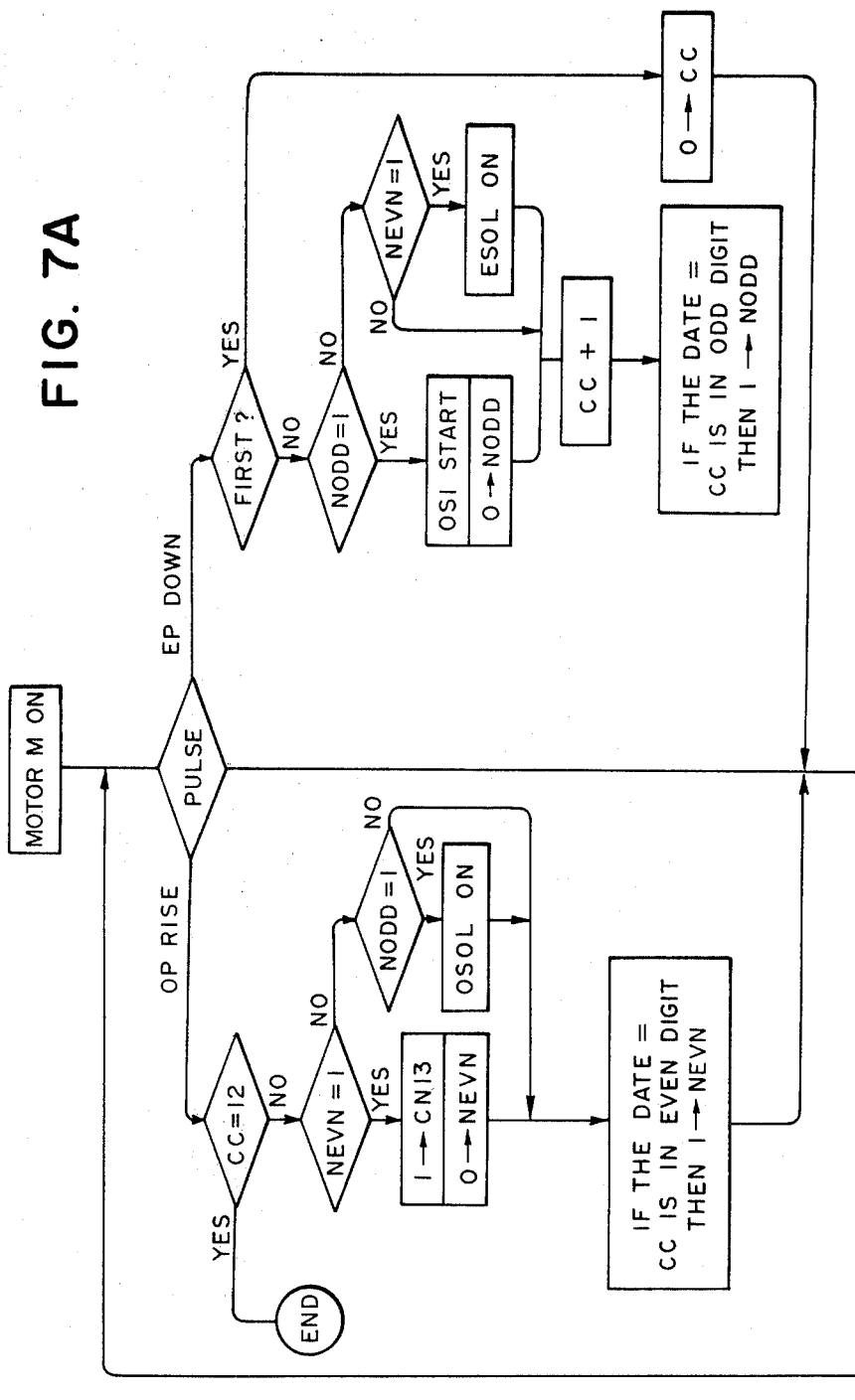

PRINTER WITH PRINTING DRUM

BACKGROUND OF THE INVENTION

1. Field of the Invention

The present invention relates to a printer with a printing drum. More particularly, the invention relates to a printing apparatus in which odd digit types and even digit types come into the printing position alternately and at the time of printing the drum is stopped on the basis of timing pulses appearing in relation to the operation of the drum and then a printing solenoid is driven.

2. Description of Prior Art

In the above mentioned type printer, the rotating printing drum should be stopped at a desired position before effecting the printing. To attain the object, hitherto, such timing pulses have been used which are generated in response to the movement of the drum. However, it takes some time from the actuation of the drum stopping mechanism to a full stop of the drum rotation at which the drum assumes the position ready for printing. The problem is that this time is not constant but variable depending on the rotational speed of the drum then used.

A known solution to the problem is to provide a sufficiently long waiting time between the actuation of the drum stopping mechanism by the drum stopping timing pulse and the start of the printing operation. This solution has widely been employed in the art. However, this solution is unfavourable, in particular for high speed printing, because such waiting time means loss time in many cases.

SUMMARY OF THE INVENTION

Accordingly, it is the principal object of the invention to solve the above problem without any need of wasteful waiting time.

According to the invention, the waiting time is determined by means of a timing pulse appearing in response to a further rotation of the drum after the drum stopping timing pulse has been generated and the drum stopping mechanism has been actuated. Since the waiting time is determined on the basis of a timing pulse generated after the actuation of the drum stopping mechanism, the drum comes to a full stop just at the end of the determined waiting time. There is no loss of time. It is made possible to neglect possible variation of stop time as mentioned above. Therefore, according to the invention, a further speed-up of printing speed can be attained, which in turn makes it possible to further increase the processing speed of the table calculator. The printer according to the invention can sufficiently follow any rapid key operation of the table calculator.

Other and further objects, features and advantages of the invention will appear more fully from the following description taken in connection with the accompanying drawings.

BRIEF DESCRIPTION OF THE DRAWINGS

FIG. 1 shows the manner in which FIGS. 1A and 1B should be arranged;

FIGS. 1A and 1B are block diagrams showing an embodiment of the invention;

FIGS. 7A and 7B are a flow chart of the apparatus.

DETAILED DESCRIPTION OF PREFERRED EMBODIMENT

Figure 1B:
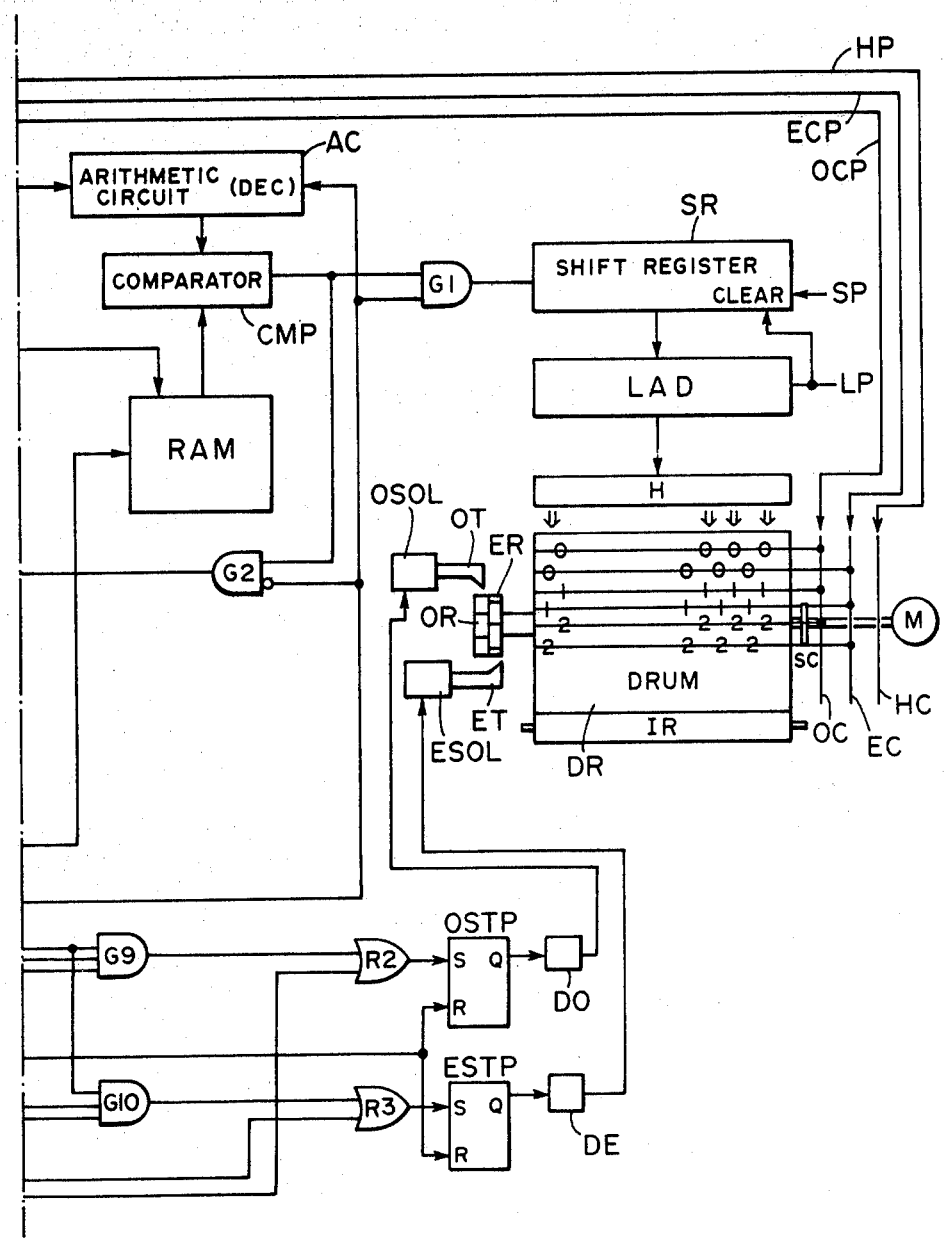

Referring first to FIGS. 1A and 1B showing an embodiment of the invention, DR designates a printing drum carrying thereon a number of printing types. The types are regularly arranged on the drum in such manner that characters in odd digits and the same characters in even digits are shifted from each other by one line as seen best in FIG. 2. With the rotation of the drum DR, odd and even digits are alternately passed through a print hammer position. The drum is mounted on a shaft. On the same shaft there are mounted also an odd pulse generating board OC and an even pulse generating board EC. The odd pulse generating board OC has a group of electrodes for generating pulses OCP indicative of characters of types corresponding to characters in odd digits. Similarly, the even pulse generating board EC has a group of electrodes for generating pulses ECP indicative of characters of types corresponding to characters in even digits.

HC is a home pulse generating board which is also mounted on the drum shaft to generate pulses HP indicative of home position. The drum shaft also has ratchets OR and ER mounted thereon. The ratchet OR has a pawl so disposed as to stop the character in odd digit on the drum DR at the printing position. The other ratchet ER has a pawl so disposed as to stop the character in even digit on DR at the printing position. The shaft of the drum DR is connected with a DC motor M through a spring clutch SC so that the drum DR can be rotated continuously.

OSOL is an odd digit stop solenoid having pawl OT engageable with the pawl of ratchet OR. When the two pawls come into engagement, the spring clutch SC is brought into operation to stop the drum DR with the selected odd digit being in the printing position.

Similarly, another solenoid, an even digit stop solenoid ESOL has pawl ET engageable with the pawl of the ratchet ER. When these two pawls come into engagement, the spring clutch SC is brought into operation to stop the drum OR at the selected even digit.

Figure 2:
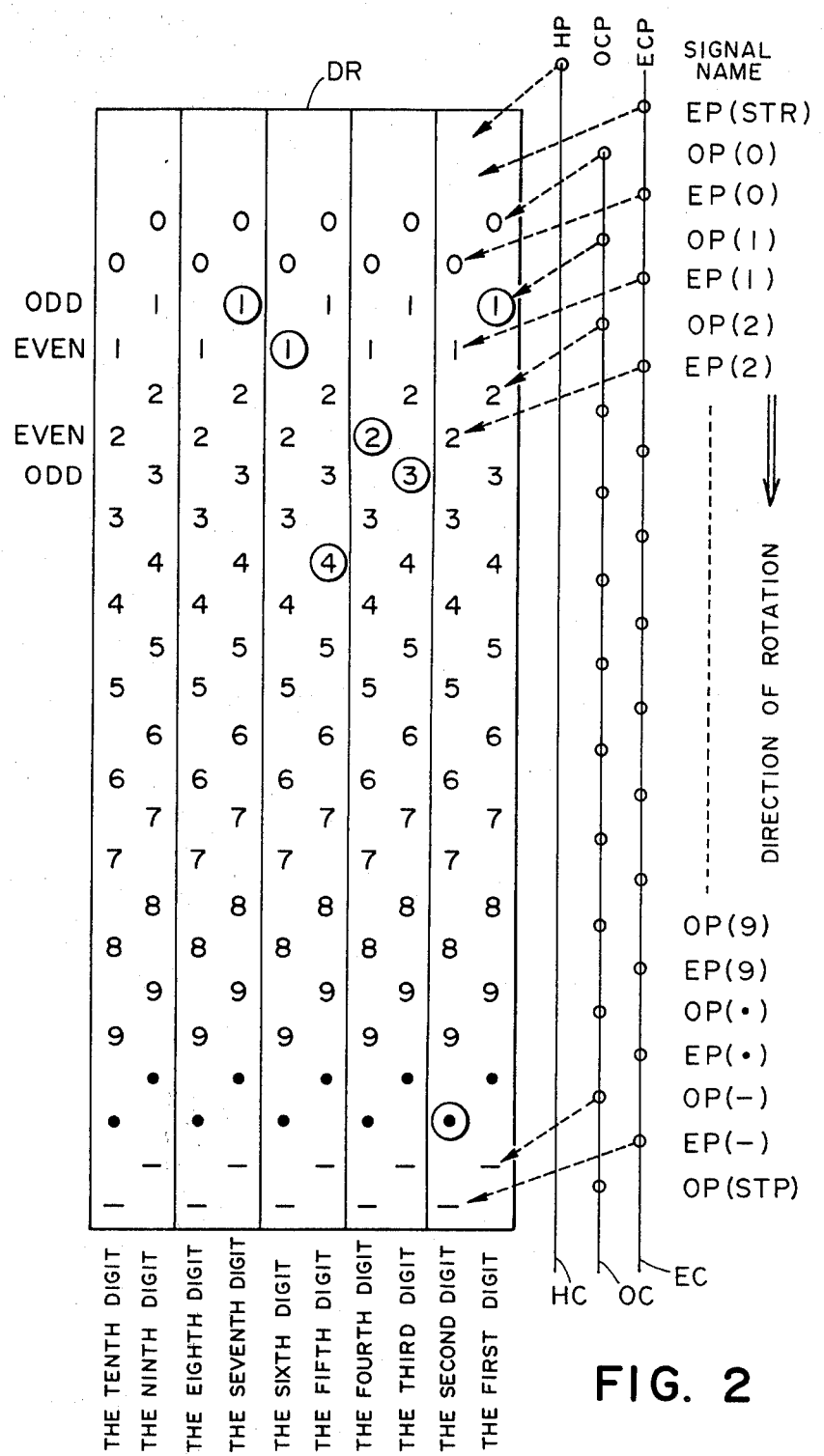
FIG. 2 is a developed view of the printing drum.

FIG. 2 is a developed view of the drum DR.

In this figure, broken lines indicate the relation in position (also in time) between electrodes and the corresponding types in every column. Electrodes are indicated by small circles. Under signal name, OP is pulse obtained by shaping the waveform of odd character pulse OCP. EP is a pulse obtained by shaping the even character pulse ECP. Given in every bracket ( ) is the character name of the type corresponding to the pulse OP of EP. EP (STR) is an even pulse EP issued at first. This pulse has no type corresponding to itself. In view of the control function, this pulse serves as a print start pulse. OP (STP) is an odd pulse OP issued last of all. This pulse also has no type corresponding to itself. In view of its function, this pulse serves as a shaping pulse for signals ECP and OCP.

Figure 3:
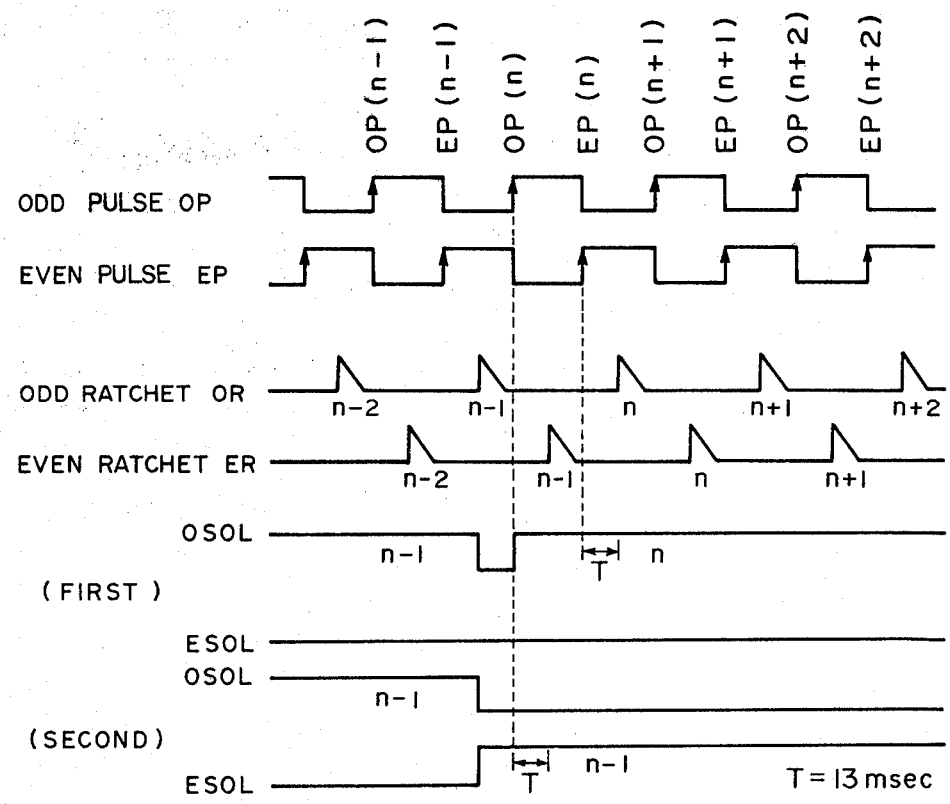
FIG. 3 is a timing chart for illustrating the drum stopping mechanism.

FIG. 3 shows the time relation between pulses OP, EP and ratchets OR, ER.

In this embodiment, the drum DR may be stopped at a selected character position in two different manners starting from the stop position at which the previously selected character has been printed. For the sake of illustration, two cases, first and second are shown in FIG. 3. One of the two stopping methods will be described in connection with the first case.

In the first case, the odd digit stop solenoid OSOL is now ON and the even digit stop solenoid ESOL is OFF. The drum is in stop at an odd, n−1 character position by ratchet OR. Starting from this position, the drum is rotated and stopped for the next printing operation. The character selected for the next printing is not even n−1 character but odd n character. Therefore, the drum has to be stopped not at even n−1 character position but at odd n character position. In this case, the drum DR is stopped in the following manner:

Initially, the stop solenoid OSOL is turned OFF to rotate the drum DR through the spring clutch SC. With the rotation of the drum, the pulse generating boards EC and OC also rotate together. At first, an odd pulse OP(n) appears. At the coming of this odd pulse OP(n), the stop solenoid OSOL is turned ON so that its pawl OT is brought into mesh with the ratchet OR's pawl corresponding to the n character. The drum does not stop immediately after the engagement of the pawl OT with the ratchet pawl. The drum continues rotating a little further. Therefore, an even pulse EP(n) subsequent to the odd pulse OP(n) appears. In this embodiment, the printing mechanism is formed in such manner that the drum stops stably after the lapse of time of 13 msec. from the coming of this even pulse EP(n), and then the printing hammer is driven. Namely, timing of drum stop is determined based upon the even pulse EP(n) in this case.

In summary, when the drum is stopped at odd n−1 character by ON of the stop solenoid OSOL and for the next time the drum is to be stopped at odd n character position, the drum can be stopped stably at the selected odd n character position through the steps of turning the solenoid OSOL OFF at first, then turning it ON at the time of appearance of odd pulse OP(n) and waiting for 13 msec. measured on the basis of the next coming even pulse EP(n).

The second drum stopping method will be described in connection with the second case shown in FIG. 3.

Like the first case described above, in this second case, it is also assumed that the drum is now stopped at odd n−1 character position by ON of the odd digit stop solenoid OSOL. However, in this second case, it is wished to stop the drum for the next time at even n−1 character position. In this case, since the odd pulse EP(n−1) corresponding to the selected even n−1 character has already passed over, the necessary stop timing cannot be obtained in the same manner as above. Therefore, in this case, the even digit stop solenoid ESOL is turned ON simultaneously with turn OFF of the odd digit stop solenoid OSOL. Thereby the drum rotates from the pawl of ratchet OR to the pawl of ratchet ER as if it was an escape wheel.

Similarly to the first case, with the rotation of the drum there appears odd pulse OP(n). After a waiting time of 13 msec. based on the pulse, the drum stops stably at the selected even n−1 character position.

To stop the drum at the selected even n−1 character position there may be used another method. For example, if the stop solenoid ESOL has previously been turned ON at the issuance of even pulse EP (n−1) prior to stopping of the drum at the odd n−1 character position, then the drum can be rotated for the next time from the odd n−1 position to the even n−1 position only by turning the stop solenoid OSOL OFF. However, according to this method, there exists a time during which both of solenoids OSOL and ESOL are ON. This is undesirable because of increased power consumption in the apparatus.

The above description relates to the mechanism for stopping the drum DR. Hereinafter, the structure and operation of the respective parts of the apparatus shown in FIG. 3 will be described in detail.

Figure 4A:
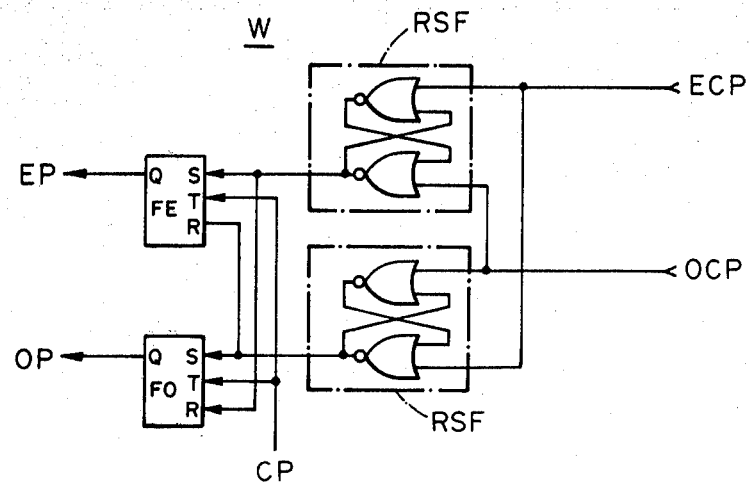
FIG. 4A shows a detailed form of a timing pulse shaping circuit.
Figure 4B:
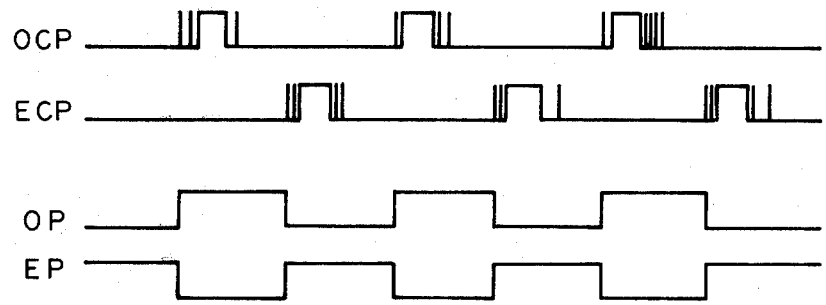
FIG. 4B is a timing chart thereof.

In FIGS. 1A and 1B, W designates a shaping circuit for reforming the distortion of waveform of the contact signals OCP and ECP caused by chattering etc., and shaping the signals into pulses OP and EP synchronized with clock pulse. The details of the shaping circuit W are shown in FIGS. 4A and 4B.

HO and HE are differentiation circuits whose function is to form a short pulse corresponding to one clock of clock pulse at the rise of signals OP and EP.

CC is a tridecimal character counter which gets an increment of count by an even pulse EP. It is set to 12 by a home pulse HP.

AC is an arithmetic circuit which normally puts out the content of CC as it was put in the circuit. However, the arithmetic circuit AC is also able to put out a value less than the content of CC by 1 when a signal is applied to its DEC terminal. RAM is a random access memory for storing data processed by a calculation unit for table calculator CAL and to be printed. The random access memory puts out into a comparator CMP data of a digit indicated by an address register ADR.

The address register ADR addresses the print data memory RAM sequentially in accordance with the state of odd pulse OP and control signal CNT. The output of RAM addressed by ADR and the output of AC are introduced into a comparator CMP which compares the two inputs. When the two inputs are equal, the comparator issues an equal signal EQ. The equal signal EQ is registered in a shift register SR through an AND gate G1.

AND gate G2 assumes a prohibited state when one shot circuit S2 is 1 but the gate puts out the equal signal EQ when OS2 is 0. Thus, if the signal EQ is 1 when one shot circuit OS2 is 0, then the corresponding flip-flop NODD or NEVN is set through gate circuit G3, or G4. The flip-flop NODD functions to store the information of whether or not the next coming type in odd digit is to be printed. NEVN is a flip-flop for storing the information of whether or not the next coming type in even digit is to be printed. It operates in synchronism with clock.

Gate G5 is an AND gate which has three inputs for receiving odd pulse OP, output from the flip-flop NODD and $\overline{\text{NEVN}}$. Similarly, G6 is an AND gate for receiving even pulse EP, output from the flip-flop NEVN and $\overline{\text{NODD}}$ as three inputs to the gate.

Gate G7 is an AND gate to which even pulse EP and output from the flip-flop NODD are applied as inputs to the gate. Gate 8 is an AND gate which has two inputs, odd pulse OP and output from the flip-flop NEVN.

The output of AND gate G7 is connected to the reset input of the flip-flop NODD and also put into OR gate R1. The output of G8 is connected to the reset input of NEVN and also put into the OR gate R1.

OS1–OS4 are one shot circuits. Each input of the respective one shot circuits is connected to the output of the respective preceding one shot circuits. The input of one shot circuit OS1 is connected to the output of OR gate R1 so that when the output of R1 becomes 1, OS-1–OS4 also becomes 1 sequentially.

Also, the output of one shot OS2 circuit is connected to DEC terminal of arithmetic circuit AC and to the input of AND GATE G1. Therefore, when the output of OS2 becomes 1, a value less than the content of AC by 1 and the corresponding digit data within the print data memory RAM are compared by the comparator CMP and then an equal signal EQ is put into the shift register SR through G1. The shift register SR has the same number of bits as the number of hammers.

LAD is a latch circuit for latching the content of shift register SR by control signal LP. LAD includes a printing hammer driving circuit.

Designated by H is a printing hammer solenoid unit which is driven when the output of the latch and drive circuit LAD becomes 1. When driven, the printing hammer solenoid unit H effects printing with the type on the drum corresponding to the hammer position.

G9 is an AND gate having three inputs connected to the output of one shot circuit OS4, even pulse EP and the output of flip-flop NEVN respectively. G10 is also an AND gate having three inputs connected to the output of one shot circuit OS5, odd pulse OP and the output of flip-flop NODD respectively.

R2 is an OR gate one input of which is connected to AND gate G9 and the other input is connected to G5. The output of the OR gate R2 is connected to the set input of flip-flop OSTP. R3 is also an OR gate one input of which is connected to AND gate G10 and the other input to G6. The output of the OR gate R3 is connected to the set input of flip-flop ESTP. OS5 is a one shot circuit which starts at the end of one shot OS3 circuit and has a one shot time shorter than that of OS4. The output of one shot circuit OS5 becomes a reset signal for flip-flops ESTP and OSTP. Outputs from the flip-flops OSTP and ESTP drive drum stopping solenoides OSOL and ESOL through drivers DO and DE respectively.

Home position signal HP in this embodiment is used to set the character counter CC and also to detect the home position at the time of the power supply being thrown in the apparatus.

For detection of home position during usual operation, the content of the character counter CC is used. Namely, the home position is determined by the time the content of character counter CC has just reached 12. At throw-in of power supply, it is uncertain where the drum is then stopping. In this case, CPU stops the drum at the home position referring to the home position pulse HP.

At the start of printing, all of the flop-flops NODD, NEVN, OSTP and ESTP are in their rest positions. Odd pulse is 0 and even pulse is 1. This is the position which the apparatus takes at the end of operation after every one rotation of the drum DR. To start printing, CPU drives at first the DC motor M. In this position, since flip-flops OSTP and ESTP are in the reset position, OSOL and ESOL are both OFF. Therefore, the drum DR starts rotating and the first pulse EP (STR) appears. This pulse EP (STR) adds 1 to the character counter CC.

The character counter CC has previously been set to 12 by home pulse HP and, therefore, the content of the counter CC now becomes 0.

Subsequently, a check is executed as to whether or not the character 0 in odd digit which enters the printing position first among types on the drum is included in the print data to be printed. To this end, the content of the character counter, namely, 0 is given to the arithmetic circuit AC. The other input DEC of the arithmetic circuit AC is 0 because of the one shot circuit OS2 being now 0. Therefore, the content of the character counter CC is transmitted to one input of the comparator CMP as it is. Applied to the other input of the comparator is data from the print data memory RAM. The data applied to CMP is determined by the content of the address register ADR. This address register ADR is controlled by odd pulse OP and control signal CNT. Since odd pulse OP is now $\phi$, the address register ADR in this position is controlled by CNT signal and it sets the addresses of data in 1st, 3rd, 5th, 7th and 9th digits within RAM sequentially in this order. For example, let the print data be 11423·1. Then, there are put out from the memory RAM data of 1, 3, 4, 1, blank, in this order according to the content of address register ADR.

These data are compared with another input 0 in the comparator CMP. As there is no data equal to another input 0, the signal of equal output EQ is 0.

The above operations relate to the pulse EP (STR) and are processed in a very short time relative to odd and even pulse intervals. After the above operation, the apparatus is waiting for the next pulse. At the drum DR continues rotating, the next pulse, odd pulse OP(0) comes out. However, since the flip-flops NODD and NEVN are in the reset position and therefore all of gates G5–G8 are closed, no further operation is initiated by this pulse signal. On the other hand, since the input OP to one input of address register ADR is 1, the address register ADR carries out addressing even digits sequentially in response to the signal to the other input of the register. More particularly, the address register ADR addresses data in 2nd, 4th, 6th, 8th and 10th digits in this order and, among 11423·1, data of ·, 2, 1, space, space, are transferred from the print data memory RAM to the comparator CMP. At this time, the comparator CMP has 0 at the other input thereof because the character counter is 0 and the input DEC of the arithmetic circuit AC is 0. Consequently, the equal signal EQ remains 0. With further rotation of the drum there is produced now even pulse EP(0). Flip-flops NODD and NEVN being reset and gates G5–G8 being closed at this time, no further operation is carried out with the coming of this even pulse EP(0).

On the other hand, the input signal OP to the address counter ADR being 0, the address register continues addressing odd digits sequentially in response to the control signal CNT in the order of 1st, 3rd, . . . 9th digit, and it puts into the comparator CMP data of 1, 3, 4, 1 among print data 11423·1 stored in the memory RAM. The even pulse EP causes the character counter CC receive an increment of count and therefore the content of the character counter becomes 1. The content of the character counter CC is applied to one input of the comparator through the arithmetic circuit AC. At the time, the one shot circuit OS2 being 0 and the input DEC of the arithmetic circuit AC also being 0, the output of AC is the same as the content of the character counter CC that is 1. Thus, when it is compared with 1 in the first and seventh digits of the print data, the equal signal EQ becomes 1. The equal signal EQ is connected to one input of gate G2 the other input of which is connected to one shot circuit OS2 which is now 0. Therefore, the gate G2 is opened.

Figure 5:
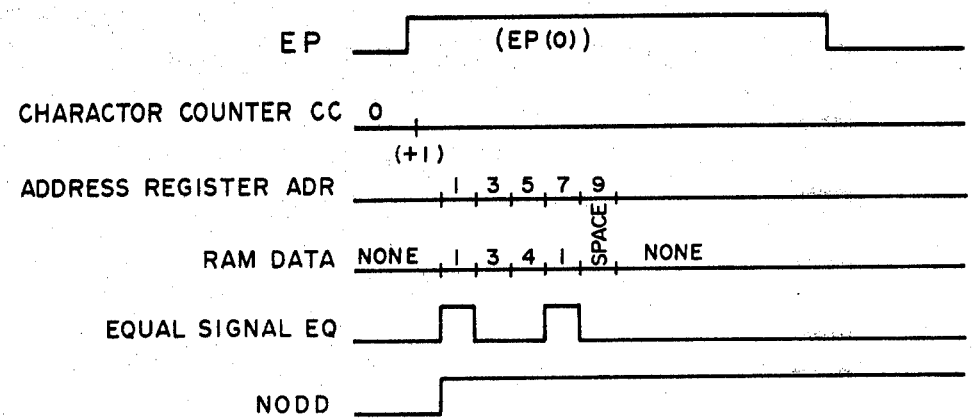
FIG. 5 is a timing chart showing a part of the operation of the apparatus.
Figure 6:
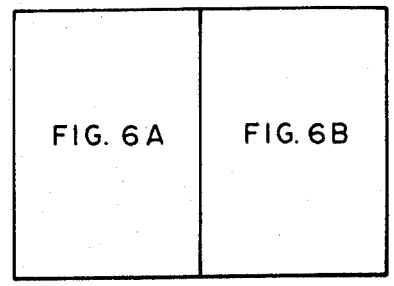
FIG. 6 shows the manner in which FIGS. 6A and 6B should be arranged.

The equal signal EQ is allowed to enter AND gate G3 passing through G2. Since the even pulse EP applied to another input of AND gate G3 is 1, the flip-flop NODD is set thereby. A series of timings described above relating to the even pulse EP(0) are shown in FIG. 5.

As the drum continues further rotating, there appears now odd pulse OP(1). At this time point, the flip-flop NODD is in its set position and its output is 1. The other flip-flop NEVN is in its reset position and its output $\overline{NEVN}$ is 1. Therefore, AND gate G5 puts out 1 which is applied to one input of OR gate R2. Now, by the output from the OR gate R2, the flip-flop OSTP is set. The output of flip-flop OSTP turns the stop solenoid OSOL ON through the driver DO. On the other hand, the odd pulse OP1 is applied to the address register ADR which gives the print data memory RAM addresses of even digits, 2nd, 4th, . . . , 10th digits in response to the control signal CNT. Then, in accordance of a series of comparing operations as described above, the content of the character counter CC that is 1 is compared with data in even digits in the print data memory. When 1 in the sixth digit of the print data is compared with the content of the character counter, the equal signal EQ becomes 1 which sets the flip-flop NEVN through gates G2 and G4. In this position, although the stop solenoid OSOL is already ON, the drum DR continues to rotate until the pawl of the ratchet OR comes into engagement with the pawl OT of the stop solenoid OSOL. There is now obtained the next pulse, even pulse EP(1) with which the apparatus is advanced to the next operation. Because of the flip-flop NODD being 1, the output of AND gate G7 becomes 1 which makes one shot circuit OS1 start through OR gate R1. As previously described in connection of the mechanism for stopping the drum, the function of one shot circuit OS1 is to provide a time of 13 msec. required to stably stop the drum DR. NODD is reset by the output of AND gate G7. On the other hand, the even pulse EP(1) adds 1 to the content of the character counter CC. The latter becomes 2 which is compared with data in odd digits because the odd pulse OP is now 0. If 2 exists in any odd digit of the print data, then the flip-flop NODD will be set. However, in this example, the print data is 11423·1 which does not include 2 in any odd digit. Therefore, no equal signal EQ is issued in this time and the flip-flop NODD is not set.

Thereafter, when 13 msec. one shot circuit OS1 becomes 0, the next one shot circuit OS2 starts and becomes 1. In this position of the apparatus, the drum is stably stopped at a position in which 1 in odd digit can be printed. When one shot circuit OS2 becomes 1, the input DEC of the arithmetic circuit AC also becomes 1. Therefore, a value obtained by subtracting 1 from the content of character counter CC, namely, $2-1=1$ is applied to one input of the comparator CMP. Applied to the other input of the comparator CMP is print data in odd digits because of the odd pulse OP being now 0. In the comparator, the input print data in odd digits are sequentially compared with the other input in the order of 1st, 3rd, 5th, 7th and 9th digit and equal output signals EQ are issued. The equal signals are serially stored in the shift register SR. After completing storing of five odd data in 1st, 3rd, . . . 9th digit in the shift register SR, these data are transferred into the latch and drive circuit LAD and at the same time the shift register SR is cleared. As soon as the print data are introduced into the latch and drive circuit LAD, the hammer solenoid H is driven to start printing. Characters to be printed at this step of printing operation are 1 in odd digits. Therefore, the hammer in charge of the first and second digit and the hammer in charge of the seventh and eighth digits are driven at this time, and 1 in the first digit and 1 in the seventh digit of the print data 11423·1 are printed. When one shot circuit OS2 becomes 0, a control signal LP is issued to transfer the content of shift register SR, that is, 0 to the latch and drive circuit. Thereby, the driving of hammer solenoid is terminated.

Also, when the one shot circuit OS2 becomes 0, the next one shot circuit OS3 starts and becomes 1. The function of this one shot circuit OS3 is to provide a time necessary for the hammer to return to its original position from the drum surface. When the one shot circuit OS3 becomes 0, the next operation starts to rotate the drum again. As previously described in connection with the drum stopping mechanism, there are two different methods for restarting the drum rotation.

In the case of this print example, data to be printed exist also in the next column. Therefore, in this case it is required to drive both of the step solenoids OSOL and ESOL in a manner similar to the case of escapement.

When the one shot circuit OS3 becomes 0, one shot circuits OS4 and OS5 start. The function of one shot circuit OS4 is to provide a time required to set flip-flops OSTP and ESTP. The function of OS5 is to make a signal for resetting them. The starting time of OS4 is shorter than that of OS5.

Since the output of one shot circuit OS5 is a reset input to flip-flops OSTP and ESTP, these flip-flops are reset. On the other hand, the output of OS4 is connected to inputs of AND gates G9 and G10 and, at present, even pulse EP is 1, odd pulse OP is 1 and flip-flop NEVN is also 1. Therefore, AND gate 10 has an output of 1 during the time of OS4 being 1 and sets the flip-flop ESTP through OR gate R3 so that the stop solenoid ESOL is turned ON through the driver DB. As the flip-flop OSTP is reset, the other stop solenoid OSOL is OFF.

Through the above operations in series, the drum restarts rotation. With rotation of the drum, there is produced odd pulse (2).

In this position, flip-flop NEVN is 1 and therefore AND gate G8 puts out 1 by which the one shot circuit OS1 is started again through OR gate. At the same time, the output of G8 resets the flip-flop NEVN. On the other hand, since odd pulse OP is 1, the address register ADR puts out addresses of even digits serially in response to the control signal CNT. With addressing, among the print data 11423·1 stored in the print data memory RAM, data of ·2, 1, space, space are put out from RAM in this order. Since the content of the character counter CC is now 2 and the one shot circuit OS2 is 0, the equal signal EQ becomes 1 when 2 is compared with the content of the counter CC. Flip-flop NEVN is again set at the time. Also, when one shot circuit OS1 becomes 0, the OS2 starts and its output becomes 1. 13 msec. after the start of OS1, the OS2 becomes 1 which is applied to the input DEC of the arithmetic circuit AC. At the time, the arithmetic circuit AC puts out a value obtained by subtracting 1 from the content of the character CC, namely, $2-1=1$. This output, 1 is applied to one input of the comparator CMP.

To make a comparison between this input, 1 and print data, the control signal CNT changes the value of address register ADR. The odd pulse being now 1, the address register ADR addresses even digits sequentially and sends out from the print data memory RAM to the comparator CMP data of ·, 2, 1, space, space, in this order among the print data 11423·1. At the same time, equal signals EQ obtained from the comparator CMP are stored in the register SR. Thus, the shift register SR is so set as to have the content of 00100.

After the results of comparison have been stored completely in the shift register SR, these data are transferred to the latch and drive circuit LAD and then the hammer solenoid is driven to print 1 in the sixth digit. When one shot circuit OS2 becomes 0, it means the end of the printing. Then, one shot circuit OS3 starts to wait for return of the hammer solenoid. Thereafter, OS4 and OS5 are started. In this position, even pulse EP is 0 and flip-flop NODD is 0. Therefore, the outputs from AND gates G9 and G10 are both 0. Consequently, flip-flops OSTP and ESTP are not set but merely reset by the one shot circuit OS5. As a result, the stop solenoids OSOL and ESOL are turned OFF and the drum starts rotating again. With this rotation of the drum there appears even pulse EP(2).

At that time, flip-flop NEVN is 1 and NODD is 0. Therefore, AND gate G6 produces 1 by which the flip-flop ESTP is set through OR gate R3 so that the stop solenoid ESOL is turned ON.

On the other hand, the even pulse EP adds 1 to the character counter CC. Thus, the content of the counter becomes 3 which is compared with print data in odd digits in the same procedure as above. Similarly to the above, when there exists any coincident character in print data, flip-flop NODD is set. In the case of the present print example, 3 exists in the third digit of the print data. Therefore, the flip-flop NODD is set.

As the drum continues rotating until the pawl ET of the stop solenoid ESOL comes into engagement with the pawl of the ratchet ER, there appears the next pulse, odd pulse OP(3). At this time, flip-flop NEVN is 1 and therefore the output of AND gate G8 becomes 1 by which the flip-flop NEVN is reset. At the same time, it makes one shot circuit OS1 start through OR gate R1.

Figure 7:
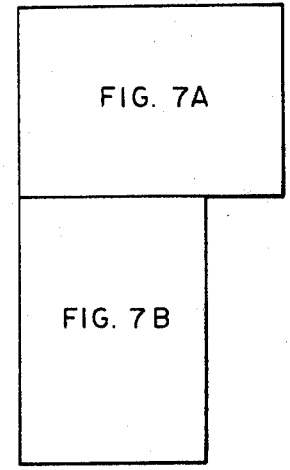
FIG. 7 shows the manner in which FIGS. 7A and 7B should be arranged.
Figure 6A:
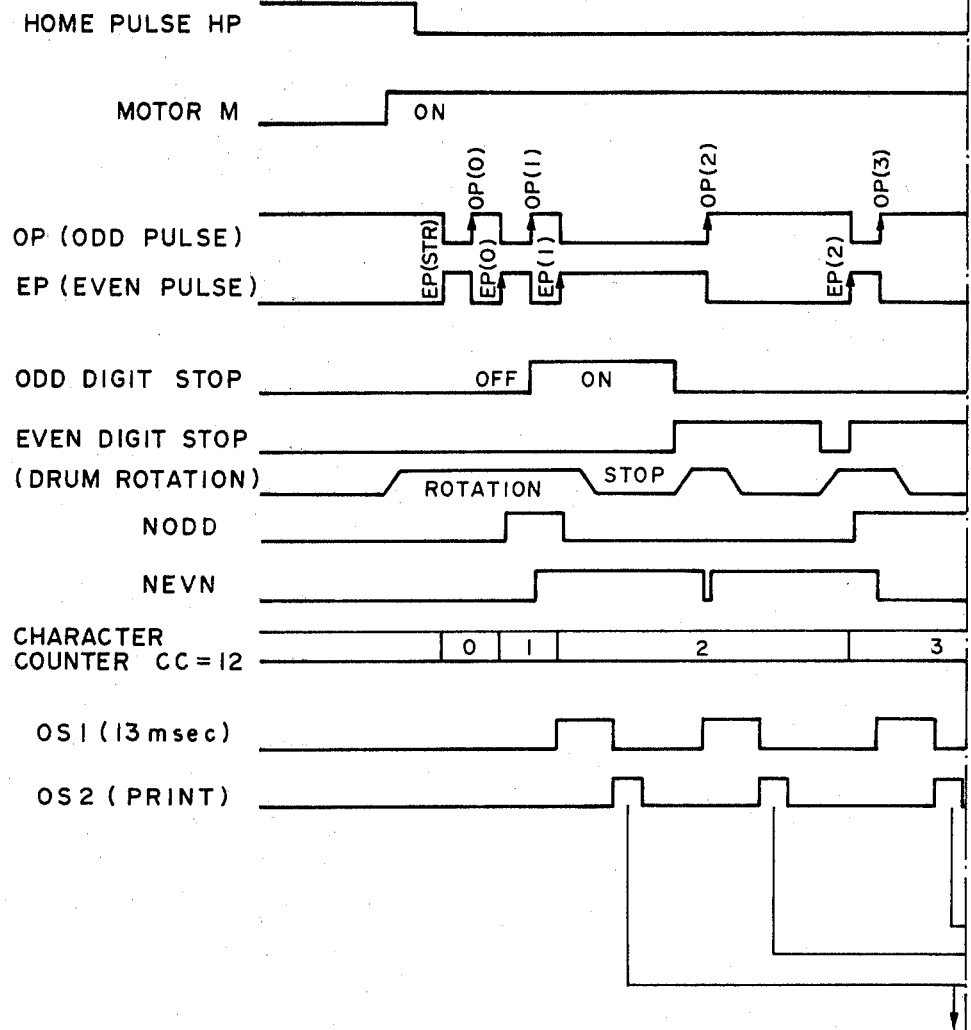
FIGS. 6A and 6B are a timing chart showing the whole operation of the apparatus.
Figure 6B:
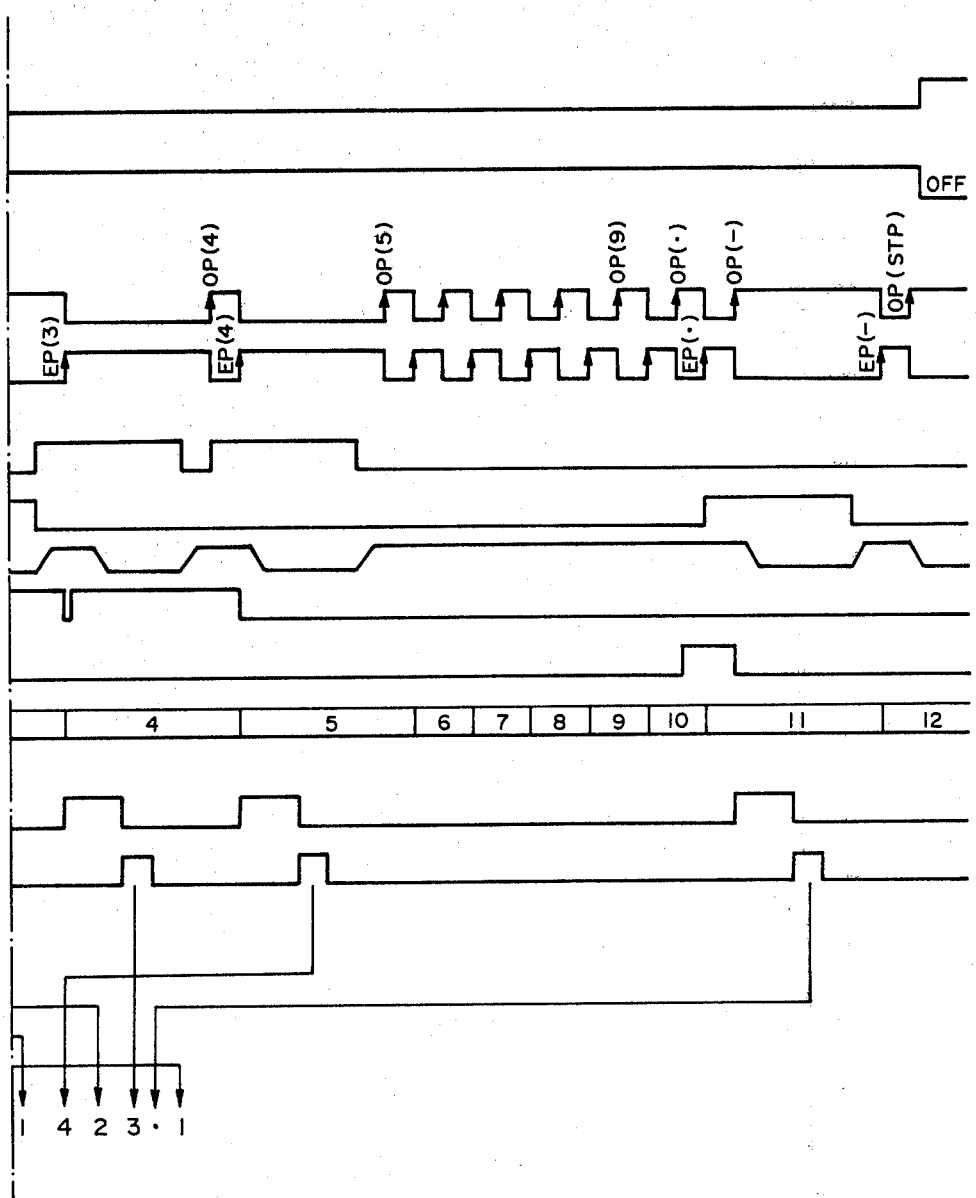
Figure 7B:
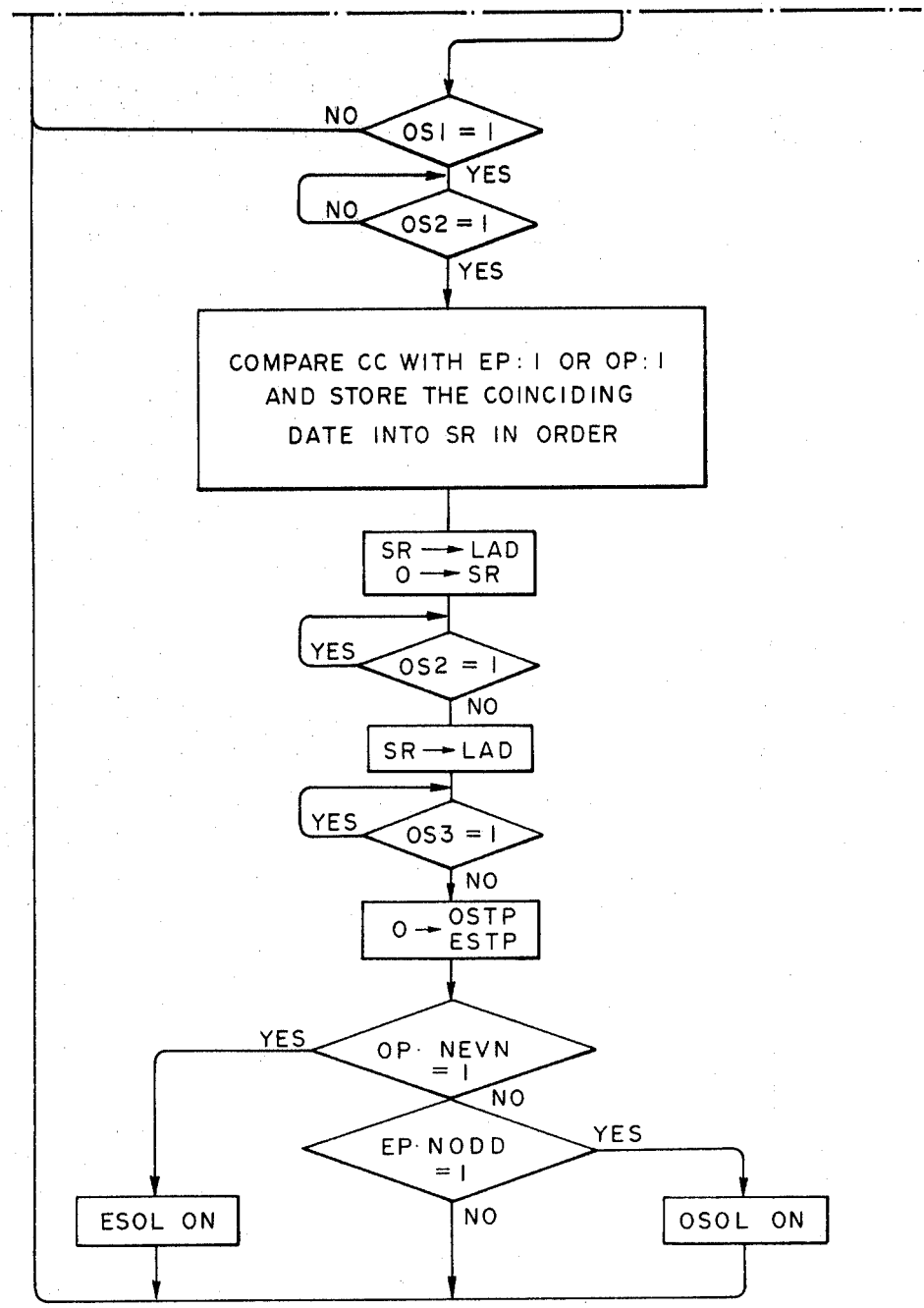

Above described operation is repeated until all of the characters of the print data are completely printed. These printing operations are readily understood from the timing chart shown in FIGS. 6A and 6B and the flow chart shown in FIGS. 7A and 7B.

In FIGS. 1A and 1B, KB designates a key board for a table calculator provided with numeral keys [0]-[9] and arithmetic operation instruction keys [×][÷] ~ [=] etc. arranged on the key board. B is a battery serving as a power source for the whole apparatus. DSP is a numeral display.

While the invention has been particularly shown and described with reference to preferred embodiments thereof, it will be understood by those skilled in the art that the foregoing and other changes in form and details can be made therein without departing from the spirit and scope of the invention.

What I claim is:
1. A printer comprising:
   a printing drum comprising a group of odd digit types and a group of even digit types, said odd digit types and said even digit types being disposed so as to come into a printing position alternately;
   means for generating timing a pulse for indicating the position of said odd digit type on said drum;
   means for generating a timing pulse for indicating the position of said even digit type on said drum;
   means for stopping said drum when any selected type or said drum comes into the print position; and
   means for carrying out printing following a predetermined time measured from detection of a timing pulse of even digit type which is positioned just before an odd digit type when the odd digit type is to be printed, and for carrying out printing following the predetermined time measured from detection of a timing pulse of odd digit which is positioned just before an even digit when the even digit is to be printed.
2. A printer according to claim 1, wherein said predetermined time is established in accordance with an output generated in a one shot circuit.

* * * * *

UNITED STATES PATENT AND TRADEMARK OFFICE
CERTIFICATE OF CORRECTION

PATENT NO. : 4,393,770

DATED : July 19, 1983

INVENTOR(S) : HIROSHI TAKAHASHI

It is certified that error appears in the above-identified patent and that said Letters Patent is hereby corrected as shown below:

Column 6

Line 31, change "At" to --As--.

Column 10

Line 31, change "or" to --on--.

Signed and Sealed this

Twenty-second Day of November 1983

[SEAL]

Attest:

GERALD J. MOSSINGHOFF

Attesting Officer

Commissioner of Patents and Trademarks